United States Patent [19]

Dyson

[11] 4,232,334
[45] Nov. 4, 1980

[54] COSMETIC APPARATUS AND METHOD

[75] Inventor: Evelyna C. Dyson, Guttenburg, N.J.

[73] Assignee: Revlon, Inc., New York, N.Y.

[21] Appl. No.: 41,536

[22] Filed: May 22, 1979

[51] Int. Cl.³ .................. H04N 7/18; G03B 21/26; G09B 29/00; G09F 9/30
[52] U.S. Cl. .................................. 358/93; 358/107; 353/28; 35/59; 272/8 D; 340/707
[58] Field of Search ............ 358/93, 96, 183, 185, 358/107; 356/2; 350/291; 353/121, 28, 30; 354/77, 62; 250/558; 272/8 D, 8 M, 13; 40/22, 394, 494, 471; 35/58, 59, 76; 364/400; 340/149 R, 706, 707, 725, 146.3 E; 33/174 D

[56] References Cited

U.S. PATENT DOCUMENTS

| | | | |
|---|---|---|---|
| 2,438,246 | 3/1948 | Henry | 35/59 |
| 2,899,860 | 8/1959 | Scott et al. | 353/28 |
| 3,047,654 | 7/1962 | Cornberg | 358/93 |
| 3,120,066 | 2/1964 | Reeves | 35/59 |
| 3,339,453 | 9/1967 | Udich | 35/59 |
| 3,659,928 | 5/1972 | Macfarlane | 35/58 |
| 3,805,238 | 4/1974 | Rothfjell | 340/146.3 E |
| 4,076,398 | 2/1978 | Galbraith | 353/28 |
| 4,160,271 | 7/1979 | Grayson et al. | 35/59 |

Primary Examiner—Robert L. Griffin
Assistant Examiner—Edward L. Coles
Attorney, Agent, or Firm—Cooper, Dunham, Clark, Griffin & Moran

[57] ABSTRACT

Disclosed in a cosmetic apparatus which helps select a make-up pattern which matches a customer's face and displays a mutually scaled and registered overlay of the selected make-up pattern and the customer's face or at least an outline of it. Also disclosed is a method of using the apparatus.

12 Claims, 6 Drawing Figures

COSMETIC APPARATUS AND METHOD

BACKGROUND AND SUMMARY OF THE INVENTION

The invention is in the general field of educational devices (more specifically surface or article demonstration devices concerned with toiletries) and is particularly directed to a cosmetic apparatus for aiding in the selection of a make-up pattern appropriate to a customer's face. The invention is also concerned with methods of using such devices.

A number of prior art patents refer to producing a composite image of a customer's face and of a make-up scheme or of a hair-do or of an article such as eyeglasses. For example, U.S. Pat. No. 2,293,271 refers to an electro-optical system for projecting, on the same screen, an image of a customer's face and slide images showing various make-up colors. Other examples are referred to in U.S. Pat. Nos. 3,339,453; 3,120,066 and 3,659,928. It is believed that the techniques referred to in such prior art rely on subjective standards operable at the time the composite image is displayed rather than an objective selection determined by previously established standards.

In contrast, the invention here is directed to a particular type of apparatus and a particular type of technique which rely on previously established standards to select a make-up pattern which best matches a customer's face and to display a mutually scaled and registered overlay of the so-selected make-up pattern and at least an outline of the customer's face.

In accordance with a particular embodiment of the invention a first step is to provide an outline of the customer's face defined by a selected number of significant facial points which are at predetermined locations on the customer's face. In one embodiment of the invention this step involves the use of a graticule through which a beauty adviser views the customer's face. The graticule has a chin bar and two side bars marked on it, and may have other markings. The beauty advisor moves the graticule relative to the customer's face so that, as viewed by the beauty adviser, the customer's chin is on the chin bar and the customer's face is just within the side bars. The beauty adviser then marks on the graticule, as by the use of adhesive-backed (or vacuum-cup) stick-on pins, a selected number of significant facial points having predetermined locations on the customer's face as viewed through the graticule, to thereby provide an outline of the customer's face.

In another embodiment of the invention this step involves the use of a video camera unit which images the customer's face on a screen at a beauty adviser's console, and the use by the beauty adviser of a light pen, which is a part of the console, to similarly mark a selected number of significant facial points having similar predetermined locations relative to the displayed image of the customer's face.

In accordance with the invention a number of different reference face patterns are stored in suitable forms. For example there may be eight such face patterns, one for a heart-shaped face, one for a diamond-shaped face, etc. Each of the reference face patterns is similarly defined by or based on a selected number of significant facial points having similar predetermined locations relative to the reference patterns. In addition, there is a respective suitably scaled make-up pattern corresponding to each of the stored face patterns. In one embodiment of the invention each reference face pattern may be a transparency with an outline of a face scaled to just fit within the chin bar and side bars on the graticule. In another embodiment the reference face patterns may be defined by sets of reference electronic signals stored in suitable electronic circuits associated with the beauty adviser's console.

As used in accordance with the invention, the so-provided outline of the customer's face and the reference face patterns are scaled with respect to each other. This facilitates proper matching of the so-provided outline of the customer's face and the reference face patterns so as to select the stored pattern which most closely corresponds to the customer's face. In one embodiment of the invention this matching is carried out by overlaying one or more of the transparencies referred to above on the graticule, in proper registration with the chin bar and side bars, to see which transparency best fits the marked points on the graticule. In another embodiment the matching is carried out by electronic circuitry which electronically matches the outline signals generated with the help of the light pen with sets of reference signals, and automatically finds the best fit.

Once the best match is found between the so-provided outline of the customer's face and a particular one of the stored face patterns, a mutually scaled and registered overlay is displayed of the outline of the customer's face and the so-selected matching make-up pattern. In one embodiment of the invention this display comprises the graticule with the marked significant points and a transparency of the selected make-up pattern. In another embodiment of the invention the overlay comprises a T.V. image of the customer's face and an overlaid T.V. image of the selected make-up pattern. In each case the customer may view this overlay as an aid to selecting and applying make-up, and as an aid to discussing appropriate make-up advice with the beauty adviser.

DETAILED DESCRIPTION

Figure 1:
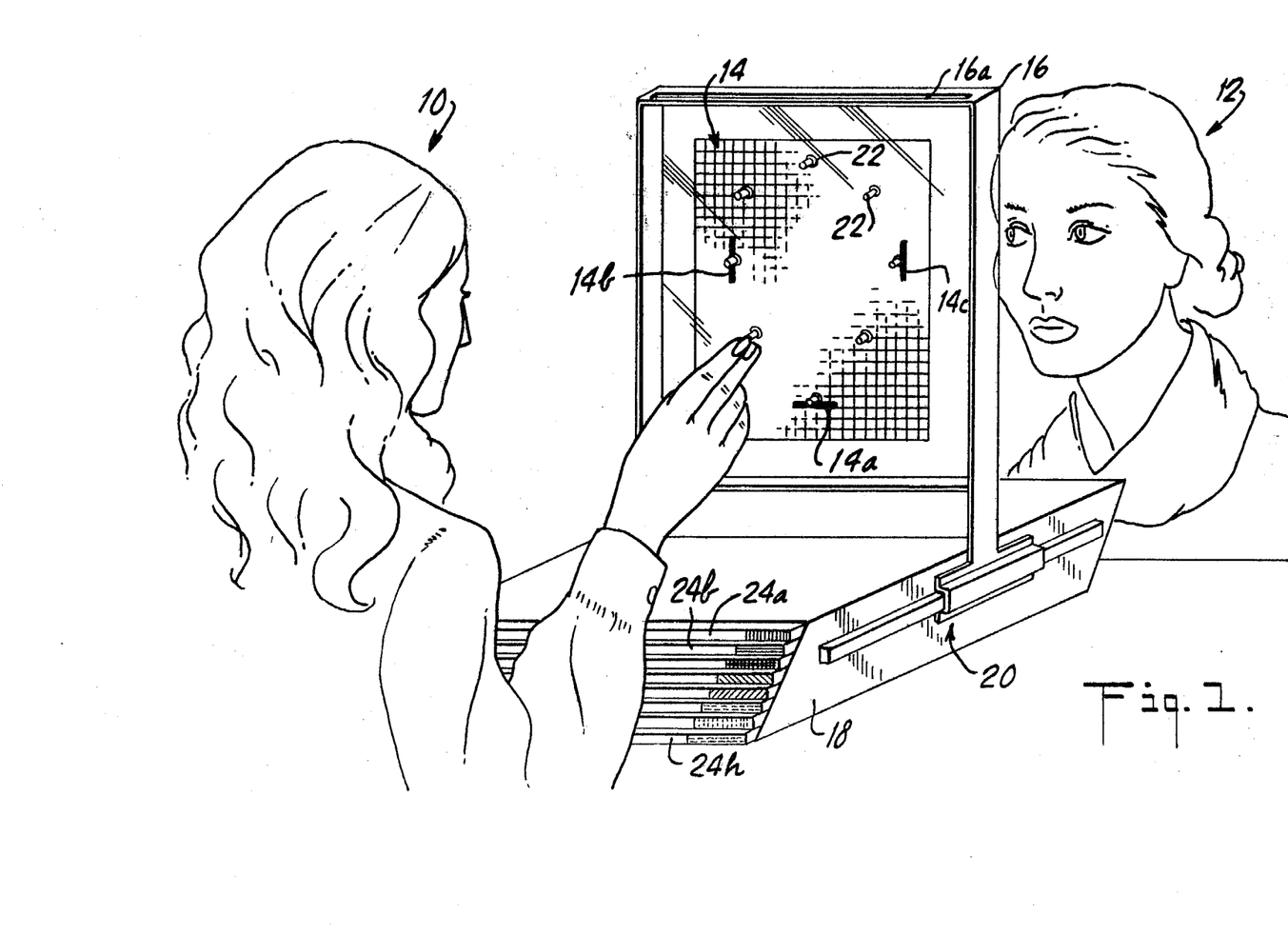
FIG. 1 illustrates an initial stage of the use of one embodiment of the invention.
Figure 1A:
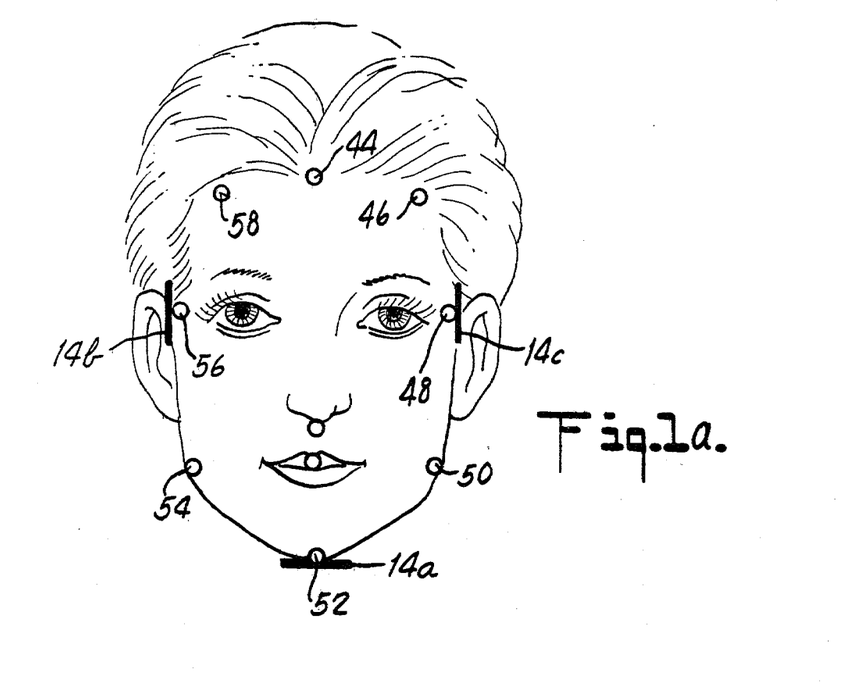
FIG. 1a illustrates an example of significant facial points outlining a customer's face.

Referring to FIG. 1, a beauty adviser at 10 views a customer's face at 12 through a graticule 14. The graticule is a transparent plate having at least a chin bar marking 14a and two side bar markings 14b and 14c, but may also have a regular grid marked on it. The graticule 14 is mounted in a vertical frame 16 which can slide relative to a base 18 along a track generally indicated at 20. In use, the beauty adviser may move relative to the graticule 14, and may also move the graticule 14 relative to the base 18 and the base 18 relative to a supporting surface so that the customer's face, as seen by the beauty adviser, has its chin on the chin bar 14a and just fits within the side bars 14*b* and 14*c*, for example as indicated at FIG. 1*a*. The beauty adviser then places a stick-on pin 22 at each of a selected number of significant facial points having predetermined locations relative to the customer's face. These locations may be as indicated in FIG. 1*a*, i.e., at the center of the hairline, at the temples, at the cheekbones, at the center of the underside of the nose, at the center of the mouth, and at the sides and bottom of the chin. These marks provide an outline of the customer's face which is scaled to a normalized size defined by the chin bar 14*a* and the side bars 14*b* and 14*c*.

Figure 2:
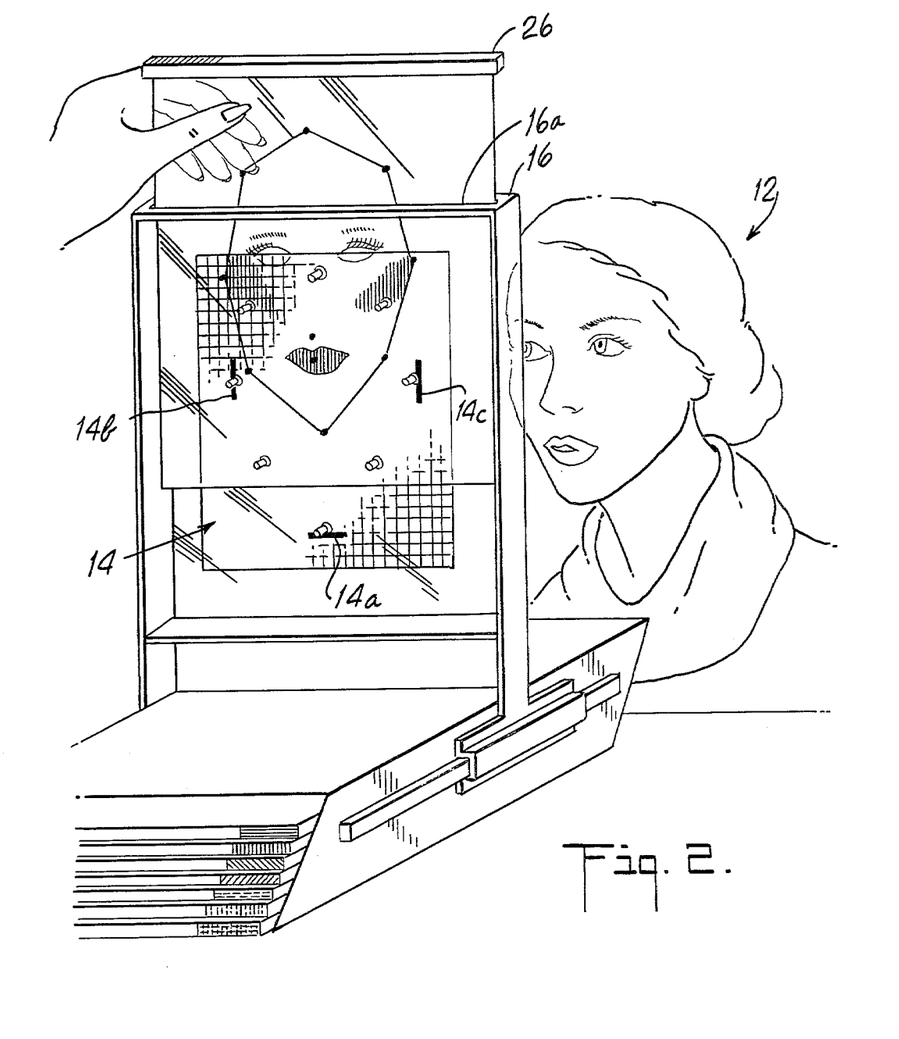
FIG. 2 illustrates another stage in the use of the device shown in FIG. 1.

The beauty adviser then finds which one among the eight transparencies 24*a* through 24*h*, stacked in the base 18, most closely matches the outline of a customer's face defined by the pins 22 on the graticule 14. Each of these reference face patterns 24*a* through 24*h* is similarly defined by a selected number of significant facial points having similar predetermined locations relative to reference faces. In addition, each of the transparencies 24*a* through 24*h* may have a make-up pattern marked thereon in black and white or in color, as indicated in FIG. 2. In the alternative, each of the transparencies 24*a* through 24*h* may have only the significant facial points marked on it, and there may be a respective separate transparency corresponding to each of the transparencies 24*a* through 24*h*, each of these separate transparencies having only a respective suitably scaled make-up pattern. Each of the transparencies 24*a* through 24*h* (and each of the separate transparencies which may be used but are not shown) is secured to a respective top bar 26 and each may be inserted, as seen in FIG. 2, in a suitable slot 16*a* in the frame 16 so as to produce, together with the pattern of pins 22, an overlay of the outline of the customer's face and the reference face pattern, as well as of any make-up pattern on the transparency. The beauty adviser compares the outline of the customer's face defined by the pins 22 with one or more of the transparencies 24*a* through 24*h* to select the stored pattern which most closely corresponds to the customer's face. Once the selection is made, the so-selected make-up pattern is displayed as an overlay of the respective transparency and the graticule with the pins 22 on it. The relative dimensions of the transparencies and the graticule 14 and frame 16 are such that the images forming the overlay are mutually scaled and registered. The customer may then view the overlay as an aid to selecting and applying make-up, and may have an appropriate discussion with the beauty adviser aided by this overlay.

Figure 3:
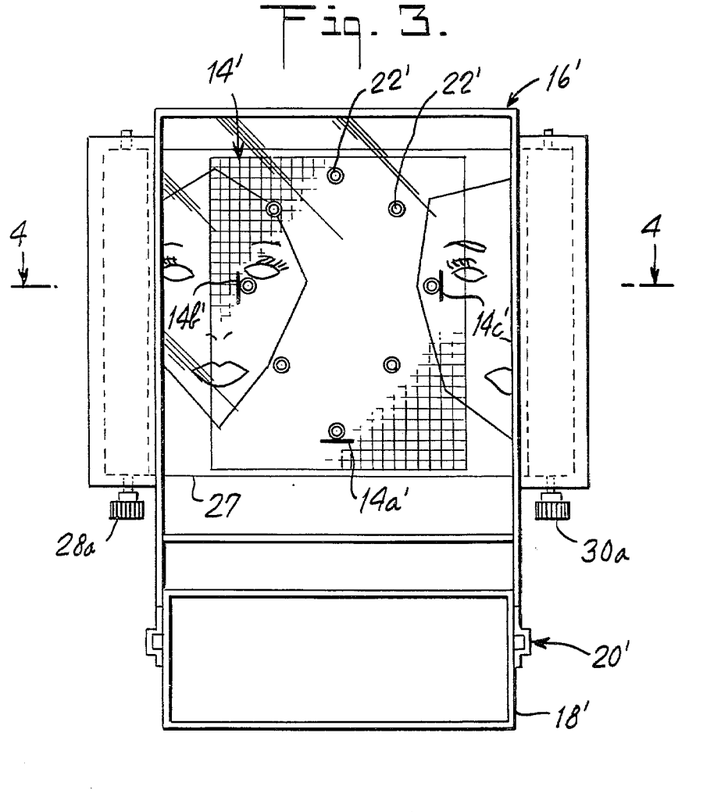
FIG. 3 is a front elevational view of another embodiment of the invention.
Figure 4:
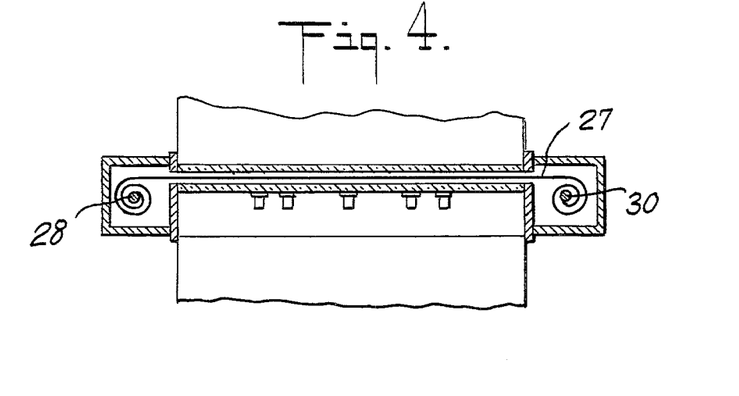
FIG. 4 is a sectional view taken along lines 4—4 of FIG. 3.

The alternate embodiment of the invention illustrated in FIGS. 3 and 4 employs similar principles. It has a similar graticule 14' mounted in a similar frame 16' which moves relative to a base 18' along a track 20'. It differs from the embodiment illustrated in FIGS. 1 and 2 in that, instead of using individual transparency sheets such as those illustrated at 24*a* through 24*h*, it uses a transparency web 27 which has one of its ends secured to a shaft 28 and the other end secured to a shaft 30. By turning respective knobs 28*a* and 30*a* the beauty adviser may center, on the graticule 14', a particular one of a number of reference face patterns which are marked side-by-side on the web 27.

The operation of the embodiment illustrated in FIGS. 3 and 4 is similar to that discussed above in connection with the embodiment illustrated in FIGS. 1 and 2. More specifically, the beauty adviser similarly views the customer's face through the graticule plate 14' while the customer's face is centered relative to the chin bar 14*a*' and the side bars 14*b*' and 14*c*' and similarly outlines the so-viewed customer's face by means of stick-on pins 22'. Then the beauty adviser works the knobs 28*a* and 30*a* to move the web 27 sideways until what is seen is an overlay of the outline of the customer's face defined by the stick-on pins 22' and the reference face pattern on the web 27 which most closely matches it. The selected match resulting from this comparison is thereby displayed as a mutually scaled and registered overlay of the so-selected reference face pattern and the so-provided outline of the customer's face. Each of the reference face patterns on the web 27 may have a respective make-up pattern outlined on it. In the alternative, there may be a separate web (not shown) having on it respective make-up patterns for the reference face patterns on the web 27, so that the outline of the customer's face, the selected reference face pattern and the make-up pattern on the separate web may be overlaid on each other in proper mutual registration. As another alternative, there may be a separate sheet (not shown), with a make-up pattern, for each respective reference face pattern, to be used in a similar overlay.

If a mirror (not shown) is pressed against the overlay and the customer views her image on the mirror through the overlay, after having properly centered the image of her face on the mirror relative to the outline defined on the graticule, the customer may also see an overlay of the selected make-up pattern and the mirror image of her face in the case of each of the embodiments of FIGS. 1–4.

Figure 5:
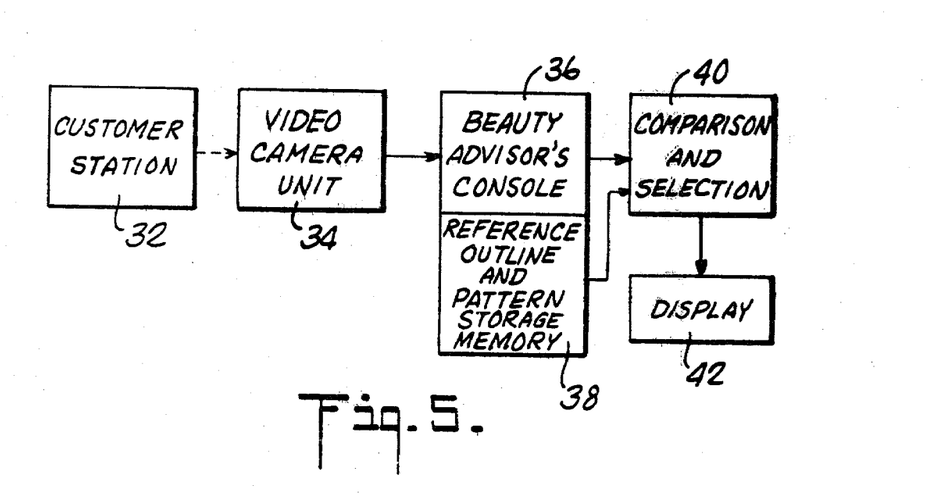
FIG. 5 is a block diagram illustrating still another embodiment of the invention.

Another embodiment of the invention, illustrated in FIG. 5, comprises a customer station 32 which may include a suitable chair for a customer and suitable lights illuminating the customer's face. A video camera unit 34 is trained on the customer station 32 to produce an initial electronic image of the face of a customer located at the station 32. The video camera unit 32 may include a conventional T.V. camera having a suitable protrait lens to produce a T.V. image of the customer's face. The image may be in black and white or in color. A beauty adviser console 36 is connected to the video unit 34 to receive the initial electronic image of the customer's face from it. The console 36 produces, on the basis of the received initial electronic image and on the basis of interactive input commands by the beauty adviser, a set of initial facial outline signals defining the relative positions of selected features of the customer's face. For example, the console 36 may include a screen showing the T.V. image of the customer's face centered relative to a chin bar and side bars shown on the screen and serving the same purpose as the chin bar and side bars discussed in connection with the embodiments of FIGS. 1–4. Rather than using stick-on pins as discussed above, the beauty adviser using the embodiment illustrated in FIG. 5 marks the same significant facial points by means of a light pen, for example, a light pen of the type referred to in U.S. Pat. Nos. 3,720,948; 4,070,710 and 3,832,693. This use of the light pen produces a set of facial outline signals, which set comprises signals defining the coordinates on the screen of the points marked by the beauty adviser. As discussed in greater detail later, this set of initial facial outline signals may be converted to a set of signals derived as certain ratios of distances between selected ones of the points marked with a light pen by the beauty adviser.

The console 36 has associated with it a storage device 38 storing a number of different sets of reference outline signals, each set defining the relative positions of features of a corresponding reference facial shape. As discussed in greater detail later, these sets of reference outline signals may comprise sets of ranges for the ratios referred to above. In addition, the storage device 38 stores, for each of the several sets of reference outline signals, a corresponding set of signals defining a make-up pattern selected as appropriate to the features of the corresponding reference facial shape. These make-up pattern signals may be in the form of T.V. images recorded on suitable media.

A comparison and selection circuit 40 is coupled with the console 36 and the storage device 38 to receive the initial set of facial outline signals and to match those signals with the reference set so as to electronically select, on the basis of such matching, the reference set which most closely corresponds to the initial set. If the initial set and the reference set are stored in the form of ratios, then the comparison and selection circuit 40 may be in the form of a circuit carrying out a tree selection of the type referred to for example in *Encyclopedia of Computer Science,* Petrocelli/Charter, New York, 1976, page 1429.

The initial electronic image of the customer's face and the reference make-up pattern which corresponds to the so-selected reference set of outline signals are displayed at a display 42 overlaid on each other. The display 42 displays the two images in registration based on the relative positions of the features defined by the initial facial outline signals and the features defined by the selected set of reference outline signals, and automatically scales at least one of the displayed images to the size of the other. The end result is similar to the overlay display discussed in connection with FIGS. 1 through 4, differing primarily by the fact that the display 42 shows the entire image of the customer's face rather than only an outline of it. The display of either or both of the customer's face and the overlaid make-up pattern may be in color or in black and white.

In the use of the embodiment shown in FIG. 5, the outline of the customer's face and the reference facial shapes may be expressed as ratios between selected significant points on the face rather than as simply an outline of the face. One example of such ratios is discussed in connection with FIG. 1a, where each of the significant points on the face is labelled with a corresponding reference numeral. In this example of the invention, five ratios are used, labelled A through E. Ratio A is the distance between the temple and the cranial dimensions, i.e. the ratio between the distance between points 46 and 48 and the distance between points 44 and 46. Ratio B is the ratio between the sum of the cranial and temple dimensions and the length dimension, i.e. the ratio between the distance between points 44 and 46 plus the distance between points 46 and 48, and the distance between points 44 and 52. Ratio C is the distance between points 48 and 56 and the distance between points 44 and 52. Ratio D is the distance between points 50 and 54 and the distance between points 48 and 56. Ratio E is the ratio between the distance from point 48 to point 56 and the distance between point 52 and the horizontal line connecting points 48 and 56. In table form these ratios can be expressed as follows:

$A = (46 \text{ to } 48)/(44 \text{ to } 46)$ $B = [(44 \text{ to } 46)+(46 \text{ to } 48)]/(44 \text{ to } 52)$ $C = (48 \text{ to } 56)/(44 \text{ to } 52)$ $D = (50 \text{ to } 54)/(48 \text{ to } 56)$ $E = (48 \text{ to } 56)/(52 \text{ to line between } 48 \text{ and } 56)$ As discussed above, eight types of faces can be classified, for example as follows:

|   | Round | Heart | Diamond | Oval | Triangular | Inv. Tri. | Square | Oblong |
|---|---|---|---|---|---|---|---|---|
| A | >1 | >1 | ≦1 | >1 | >1 | <1 | >1 | >1 |
| B | N | >.4 | <.3 | N | N | N | N | N |
| C | <.7 | U | U | ≧.7 | <.7 | U | <.7 | ≧.7 |
| D | N | N | N | ≦.78 | N | N | N | >.78 |
| E | ≅1.3 | N | N | N | ≅1.2 | N | ≅1.1 | N |

In the face shape classification table above, the classification Round is given to a face where the ratio A is greater than 1, the ratio C is less than 0.7, and the ratio E is about 1.3. Other face shapes are classified in a similar manner as indicated in the table. The notation N in the table means that the particular ratio is not applicable to the particular classification and the term U indicates that this ratio is unique to an individual face and is not used in the classification according to the table above.

The items designated 36, 38 and 40 in FIG. 5 may be implemented by means of a commercially available console having a light pen, a commercially available digital computer having the capabilities of, for example, an Eclipse machine made by DGI, and a suitable commercially available memory, all interconnected and conditioned by a suitable hardware, firmware and/or software program to carry out the relevant steps of the invention. In this example use is made of another significant point on the image of the customer's face. This point is labelled 57 at FIG. 1a and is the intersection of a horizontal line through points 45 and 56 and a vertical line through points 44 and 52. It may be marked by use of the light pen, as are the other points, or its coordinates may be found by the circuitry of the console in accordance with known principles. For simplicity in the description below, it will be assumed that point 57 is marked by use of the light pen, although in practice its coordinates would be found otherwise.

The relevant steps of this embodiment of the invention may be as follows:

1. Store in respective locations i in memory, where i=0, 1, 2 . . . , the x and y coordinates of the following points P(i) marked on the image of the customer's face, in that sequence: 57, 52, 44, 46, 48, 56, 50 and 54, and set to 0 each of indices i and j, each index designating a location in memory;
2. Fetch from memory the coordinates of points P(i) and P(i+1). In the first pass through this step 2, this would be points 57 and 52;
3. Find the distance S(j) between the points fetched in step 2, for example by finding the square root of the sum of the square of the difference between the x coordinates of the points and the square of the difference between the y coordinates of the points, and store the found distance in location j in memory;
4. Increment each of indices i and j by 1;
5. Compare the current value of the index i to 7. If it is not equal, go back to step 2, so that the next two points can be fetched from memory, so as to be run through steps 2 and 3. If the current value of index i is 7, go on to step 6;

6. Find the ratios A through E discussed above by using the contents of the memory locations identified by the indices j in accordance with the following expressions, where S(0) designates the distance found in step 3 between the points 57 and 42, etc.:

$$A = S(3)/S(2)$$

$$B = [S(2) + S(3)]/S(1)$$

$$C = S(4)/S(1)$$

$$D = S(6)/S(4)$$

$$E = S(4)/S(0)$$

Store the ratios A through E found in accordance with the above expre-sions in corresponding locations in memory designated A through E.

Once the ratios A through E have been found as discussed above, the selected computer configuration can be operated in accordance with the following exemplary sequence to classify the customer's face:

1. Fetch ratio A from the memory and compare it to 1. If the ratio is equal to 1 within a selected tolerance then the face is classified as diamond-shaped. If the ratio is greater than 1, considering the selected tolerance, go to step 2. If the ratio is less than 1, again considering the selected tolerance, then go to step 6;

2. Fetch ratio B and compare it to 0.4. If the ratio is greater than or equal to 0.4, considering a selected tolerance, then the face is classified as heart-shaped. If the ratio is less than 0.4, again considering the selected tolerance, then go on to step 3;

3. Fetch ratio C and compare it to 0.7. If the ratio is greater than or equal to 0.7, considering a selected tolerance, go on to step 4. If the ratio is less than 0.7, again considering the selected tolerance, go on to step 5;

4. Fetch ratio D and compare it to 0.78. If the ratio is greater than 0.78, considering a selected tolerance, the face is classified as oblong. If the ratio is less than or equal to 0.78, again considering the selected tolerance, then the face is classified as oval;

5. Fetch ratio E and compare it to 1.2. If the ratio is equal to 1.2, within a selected tolerance, the face is classified as triangular. If the ratio is less than 1.2, again considering the selected tolerance, the face is classified as square. If the ratio is greater than 1.2, again considering the selected tolerance, the face is classified as round;

6. Fetch ratio B and compare it to 0.3. If the ratio is greater than or equal to 0.3, considering a selected tolerance, the face is classified as diamond-shaped. If the ratio is less than 0.3, again considering the selected tolerance, the face is classified as inverted triangular.

Of course, the sequence discussed immediately above stops once a face is classified, and the machine proceeds to the next sequence of steps, which involves displaying the overlay discussed above. To display this overlay, the stored face pattern which corresponds to the shape selected as discussed immediately above is located in the storage device for face patterns. This storage device may be, for example, a video tape unit storing face patterns and appropriate make-up patterns. The so-located make-up pattern is transferred to the console 36 and the display 42 to be displayed thereon as an overlay scaled to the size of the displayed customer's face. This scaling may be done in any one of a number of ways. For example, the screen of the console 36 may have marked thereon a chin bar and side bars similar to those labelled 52, 14b and 14c in FIG. 1a, and the beauty adviser may initially center the displayed face as indicated in FIG. 1a. This centering may be done by moving the video camera and/or its lens relative to the customer at station 32. In the alternative, the centering may be done by appropriate controls at the console 36 to magnify or reduce the size of the displayed face and to move it in the x and y directions relative to the chin and side bars. Assuming that the stored make-up patterns are to the scale determined by the chin bar and side bars, no further scaling is necessary for a properly scaled overlay. As another alternative, there may be no chin bar and side bars at the screen of the console, and the necessary scaling and registering may be done by appropriate electronic circuitry at the time the overlaid display is produced, in accordance with known techniques for scaling and registering overlaid images.

The procedures discussed above as being carried out with the help of a commercially available digital computer and associated equipment may, in the alternative, be partly or fully implemented by appropriate special purpose circuits using conventional components and subassemblies. For example, the prodecure for finding the ratios A through E discussed above may be implemented by use of a memory, such as a semiconductor memory of sufficient capacity to store the coordinates of the necessary points and the computed ratios, a circuit for computing the ratios S(j) discussed above in accordance with the expression discussed above, which circuit may comprise a suitable combination of conventional subassemblies such as subtractors, multipliers, adders and square root circuits, and a suitable clock and index counter to effect the necessary transfers of electrical signals between the appropriate components and subassemblies. Similarly, the sequence for selecting the reference outline which most closely matches the outline of the customer's face may be implemented by a combination of conventional comparators organized in accordance with the sequence discussed above to determine the classification of the customer's face. The important considerations for this invention are not the particular components selected to carry out the steps of the invented sequence but the combination of these steps and the organization of the apparatus which carries out the invention.

I claim:

1. A cosmetic apparatus for selecting a make-up pattern which best matches a customer's face and for displaying a mutually scaled and registered overlay of the selected make-up pattern and at least an outline of the customer's face comprising:

means for providing an outline of the customer's face defined by a selected number of significant facial points having predetermined locations relative to an image of the customer's face;

means for storing a number of different reference face patterns each of which is similarly defined by a selected number of significant facial points having similar predetermined locations relative to reference faces, and for storing a respective suitably scaled make-up pattern corresponding to each of said stored face patterns;

means for matching said outline of the customer's face with said stored reference face patterns to select the stored reference face pattern which most closely matches the customer's face;

means for displaying a mutually scaled and registered overlay of the make-up pattern corresponding to the so-selected reference face pattern and at least the so-provided outline of the customer's face.

2. A cosmetic apparatus for selecting a make-up pattern as in claim 1 in which the means for providing an outline of the customer's face comprise a transparent plate movable with respect to the customer'face and/or the beauty adviser and having marked thereon indicia within which the customer's face can be registered to thereby normalize the size thereof and means for indicating the location, on said plate, of said significant facial points having said predetermined locations relative to the image of the customer's face registered with said indicia on the plate.

3. A cosmetic apparatus for selecting a make-up pattern as in claim 2 in which the means for storing reference face patterns and make-up patterns comprise transparencies each having a different reference pattern and/or make-up pattern marked thereon, each of said patterns being scaled to the indicia marked on said plate, and where the means for matching said outline of the customer's face with the stored reference patterns comprise means for selectively aligning successive ones of said referenced face patterns with the outline of the customer's face marked on the plate so that an overlaid image may be viewed by the beauty adviser.

4. A cosmetic apparatus for selecting a make-up pattern as in claim 3 in which each of said patterns is on a separate transparency sheet comparable in size to the size of said pattern and where the means for matching include a frame supporting the plate and having means defining a slot for overlaying the pattern on the transparency and the outline of the customer's face marked on the plate with each other in mutually scaled and registered relationship.

5. A cosmetic apparatus for selecting a make-up pattern as in claim 3 in which said transparencies form a part of a continuous web and where the means for matching comprise means for moving the web relative to the plate to align successive patterns in registration with said outline of the customer's face marked on the plate so that the beauty adviser may view successive overlays of the outline of the customer's face and of individual ones of said patterns in mutual registration with each other.

6. A cosmetic apparatus for selecting a make-up pattern as in claim 1 in which the means for providing an outline of the customer's face comprise a video camera unit trained on the customer's face to produce an initial electronic image thereof and a beauty adviser console connected to the video unit to receive the initial electronic image of the customer's face from it and having means to produce, on the basis of the received initial electronic image and interactive input commands by the beauty adviser, a set of initial facial outline signals defining the relative positions of selected features of the customer's face.

7. A cosmetic apparatus for selecting a make-up pattern as in claim 6 in which the means for storing a number of different patterns and the means for matching comprise means for electronically storing a number of different sets of reference outline signals, each set defining the relative positions of features of a corresponding reference face pattern, and for storing, for each set of reference outline signals, a corresponding set of signals defining a make-up pattern selected as appropriate to the features of the corresponding reference face pattern and means coupled with the console and the storing means for electronically comparing the initial set of facial outline signals with the reference set and for electronically selecting, on the basis of the comparison, the reference set which most closely corresponds to the initial set.

8. A cosmetic apparatus for selecting a make-up pattern as in claim 7 in which said console includes means for producing a set of initial facial outline signals defining the ratios between the distances separating selected points on the image of the customer's face and the means for storing sets of reference outline signals comprise means for storing sets of reference outline signals made up of similar sets of ratios between selected significant points of reference face patterns, and where the means for matching comprise means for comparing the ratios based on the image of the customer's face with the ratios of said reference patterns.

9. A cosmetic apparatus which selects a make-up pattern matching a customer's facial features and displays a mutually registered and scaled overlay of an image of the customer's face and of the so-selected make-up pattern comprising:

a customer's station and a video camera unit trained on the station to produce an initial electronic image of the face of a customer located at the station;

a beauty adviser console connected to the video unit to receive the initial electronic image of the customer's face from it and having means to produce, on the basis of the received initial electronic image and interactive input commands by the beauty adviser, a set of initial facial outline signals defining the relative positions of selected features of the customer's face;

means for electronically storing a number of different sets of reference outline signals, each set defining the relative positions of features of a corresponding reference facial shape, and for storing, for each set of reference outline signals, a corresponding set of signals defining a make-up pattern selected as appropriate to the features of the corresponding reference facial shape;

means coupled with the console and the storing means for electronically comparing the initial set of facial outline signals with the reference sets and for electronically selecting, on the basis of the comparison, the reference set which most closely corresponds to the initial set; and means for displaying the initial electronic image of the customer's face and for overlaying on it a display of the reference make-up patterns which corresponds to the so-selected reference set of outline signals, the displayed facial image and the displayed make-up pattern being registered with each other on the basis of the relative positions of the features defined by the initial facial outline signals and the features defined by the selected set of reference outline signals, and at least one of the displayed image of the customer's face and the displayed make-up pattern being scaled to the size of the other.

10. A cosmetic apparatus as in claim 9 in which the console includes means for producing a set of initial facial outline signals which define the ratios between the distances separating selected points on the image of the customer's face, the means for storing reference outline signals include means for storing similar ratios related to similar significant points of reference facial shapes and the means for comparing comprise means for comparing the ratios based on the image of the customer's face with said ratios based on the reference facial shapes.

11. A cosmetic method of selecting a make-up pattern which best matches a customer's face and of displaying a mutually scaled and registered overlay of the selected make-up pattern and at least an outline of the customer's face comprising the steps of:

providing an outline of the customer's face defined by a selected number of significant facial points having predetermined locations relative to an image of the customer's face;

storing a number of different reference face patterns each of which is similarly defined by a selected number of significant facial points having similar predetermined locations relative to reference faces and storing a respective suitably scaled make-up pattern corresponding to each of said stored face patterns;

matching said outline of the customer's face with said stored reference face patterns to select the stored reference face pattern which most closely matches the customer's face; and displaying a mutually scaled and registered overlay of the make-up pattern corresponding to the so-selected reference face pattern and at least the so-provided outline of the customer's face.

12. A cosmetic method of selecting a make-up pattern matching a customer's facial features and displaying a mutually registered and scaled overlay of an image of the customer's face and the so-selected make-up pattern comprising the steps of:

training a video camera unit on the face of a customer to produce an initial electronic image of the customer's face;

converting the initial electronic image of the customer's face to a set of initial facial outline signals which electronically define the relative positions of selected features of the customer's face;

electronically storing a number of different sets of reference outline signals, each set defining the relative positions of features of a corresponding reference facial shape, and storing for each set of reference outline signals, a corresponding set of signals defining a make-up pattern selected as appropriate to the features of the corresponding reference facial shape;

electronically comparing the initial set of facial outline signals with the reference sets and electronically selecting, on the basis of the comparison, the reference set which most closely corresponds to the initial set; and displaying the initial electronic image of the customer's face and overlaying on it a display of the reference make-up pattern which corresponds to the so-selected reference set outline signals, the displayed facial image and the displayed make-up pattern being registered with each other on the basis of the relative positions of the features defined by the initial facial outline signals and the features defined by the selected set of reference outline signals, at least one of the displayed image of the customer's face and the displayed make-up pattern being scaled to the size of the other.

* * * * *